(12) United States Patent
Cronholm

(10) Patent No.: US 11,467,708 B2
(45) Date of Patent: Oct. 11, 2022

(54) ACTIVATION OF A VIRTUAL OBJECT

(71) Applicant: Crunchfish Gesture Interaction AB, Malmö (SE)

(72) Inventor: Paul Cronholm, Malmö (SE)

(73) Assignee: Crunchfish Gesture Interaction AB, Malmö (SE)

(*) Notice: Subject to any disclaimer, the term of this patent is extended or adjusted under 35 U.S.C. 154(b) by 0 days.

(21) Appl. No.: 16/617,557

(22) PCT Filed: May 29, 2018

(86) PCT No.: PCT/SE2018/050537
§ 371 (c)(1),
(2) Date: Nov. 27, 2019

(87) PCT Pub. No.: WO2018/222115
PCT Pub. Date: Dec. 6, 2018

(65) Prior Publication Data
US 2020/0183565 A1 Jun. 11, 2020

(30) Foreign Application Priority Data
May 30, 2017 (SE) .................... 1750672-6

(51) Int. Cl.
*G06F 3/04812* (2022.01)
*G02B 27/01* (2006.01)
*G06F 3/01* (2006.01)

(52) U.S. Cl.
CPC ..... *G06F 3/04812* (2013.01); *G02B 27/0172* (2013.01); *G06F 3/013* (2013.01); *G06F 3/017* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 8,622,742 B2 * | 1/2014 | Benko | G06F 3/04883 434/118 |
| 9,134,798 B2 | 9/2015 | Morris et al. | |
| 9,223,415 B1 * | 12/2015 | Zhou | G06K 9/20 |
| 9,298,263 B2 * | 3/2016 | Geisner | G06F 3/011 |
| 10,403,046 B2 * | 9/2019 | Pinti | G06F 3/0304 |

(Continued)

FOREIGN PATENT DOCUMENTS

| | | |
|---|---|---|
| WO | 2012128399 A1 | 9/2012 |
| WO | 2014113454 A1 | 7/2014 |
| WO | 2015186925 A1 | 12/2015 |

OTHER PUBLICATIONS

White et al, Visual Hints for Tangible Gestures in Augmented Reality, 2007, IEEE, pp. 1-4) (Year: 2007).*

(Continued)

*Primary Examiner* — Ryan F Pitaro
(74) *Attorney, Agent, or Firm* — Burr & Forman LLP

(57) ABSTRACT

A VR device (110) comprising a controller (910) configured to: present a Virtual Reality space (120) comprising at least one virtual object (130) being associated with a gesture for executing an action associated with said virtual object (130); determine that the virtual object (130) is in a Line Of View (LOV); and providing a graphical marking (140) of the virtual object (130); wherein the graphical marking includes an indication of the associated gesture.

15 Claims, 6 Drawing Sheets

(56) References Cited

U.S. PATENT DOCUMENTS

| | | | |
|---|---|---|---|
| 10,424,103 B2* | 9/2019 | Eden | A63F 13/219 |
| 10,569,164 B1* | 2/2020 | Bleasdale-Shepherd | A63F 13/86 |
| 2008/0178126 A1* | 7/2008 | Beeck | G09B 5/06 715/863 |
| 2011/0119216 A1* | 5/2011 | Wigdor | G06F 3/017 706/46 |
| 2012/0081278 A1* | 4/2012 | Freedman | G06F 3/04886 345/156 |
| 2012/0144330 A1* | 6/2012 | Flint | G06F 3/04847 715/765 |
| 2012/0306850 A1 | 12/2012 | Balan | |
| 2013/0007616 A1* | 1/2013 | Bell | G06F 3/017 715/709 |
| 2013/0050432 A1 | 2/2013 | Perez et al. | |
| 2013/0307875 A1 | 11/2013 | Anderson | |
| 2014/0189602 A1* | 7/2014 | Wang | H04M 1/72412 715/863 |
| 2014/0237425 A1* | 8/2014 | Chan | G06F 3/0482 715/810 |
| 2014/0240255 A1* | 8/2014 | Kim | G06F 3/0412 345/173 |
| 2014/0298162 A1* | 10/2014 | Cohen | G06F 40/103 715/234 |
| 2015/0106709 A1* | 4/2015 | Kritt | G06F 3/0484 715/708 |
| 2015/0317518 A1 | 11/2015 | Fujimaki | |
| 2016/0018885 A1* | 1/2016 | Kimura | G06T 7/70 345/156 |
| 2016/0035138 A1* | 2/2016 | Kim | G06K 9/00 345/633 |
| 2016/0078289 A1* | 3/2016 | Michel | G06K 9/00355 345/156 |
| 2016/0117860 A1* | 4/2016 | Fei | G06F 3/04815 345/419 |
| 2016/0321841 A1* | 11/2016 | Christen | G06F 3/167 |
| 2017/0038837 A1* | 2/2017 | Faaborg | G06F 3/011 |
| 2017/0053621 A1* | 2/2017 | Chen | G06F 3/1454 |
| 2017/0185148 A1* | 6/2017 | Kondo | G06F 3/011 |
| 2017/0272838 A1* | 9/2017 | Glazer | H04N 21/44218 |
| 2018/0136465 A1* | 5/2018 | Chi | G02B 27/0172 |
| 2018/0143756 A1* | 5/2018 | Mildrew | G06F 3/0482 |
| 2018/0210642 A1* | 7/2018 | Bognar | G06F 3/04886 |
| 2018/0224980 A1* | 8/2018 | Avila | G06F 3/017 |
| 2018/0329501 A1* | 11/2018 | Marchenko | G06F 3/017 |
| 2019/0060742 A1* | 2/2019 | Moon | G06F 3/04842 |
| 2019/0236344 A1* | 8/2019 | Chen | G06K 9/00355 |
| 2019/0282324 A1* | 9/2019 | Freeman | A61B 34/25 |
| 2019/0290129 A1* | 9/2019 | Hanina | G16H 50/20 |
| 2019/0369755 A1* | 12/2019 | Roper | G06F 3/0383 |
| 2020/0075011 A1* | 3/2020 | Yao | G06K 9/00281 |
| 2020/0117336 A1* | 4/2020 | Mani | G06F 3/017 |
| 2021/0103348 A1* | 4/2021 | Jeppsson | G06K 9/00355 |

OTHER PUBLICATIONS

International Search Report and Written Opinion of corresponding international application No. PCT/SE2018/050537 dated Aug. 15, 2018.

Search Report of corresponding Swedish application No. SE 1750672-6 dated May 30, 2017.

Notice issued in corresponding Swedish application No. SE 1750672-6 dated Jan. 23, 2018.

* cited by examiner

ACTIVATION OF A VIRTUAL OBJECT

TECHNICAL FIELD

This application relates to a method, a computer-readable medium and a device for providing improved activation of a virtual object, and in particular to a method, a computer-readable medium and a device for activation of a virtual object in an augmented reality, a virtual reality or a mixed reality for providing a touchless gesture-based user interface.

BACKGROUND

Virtual Reality, or VR, has been known since the late 1970s and many solutions have been proposed for how to provide user input including wearing special gloves or keypads, especially for handling, such as when selecting and activating a virtual object. Some examples of such systems are proposing to use a motion sensor (such as an accelerometer and/or a gyroscope) for determining the movements of a user's head and thereby tracking what the user is watching in the virtual reality.

However, as the user's head is used for input and the virtual reality is often well encompassing and comprising more content than is displayed at an instance in time, and as the virtual reality often comprises many objects which may all be associated with different functions and gestures, users are often confused and find it difficult to handle such systems and to select and execute correct or desired functions, at least before substantial training has been performed.

There is thus a need for a VR device that facilitates user's perception enabling them to navigate complex Virtual reality landscapes.

SUMMARY

It is an object of the teachings of this application to overcome the problems listed above by providing a VR device comprising a controller configured to: present a Virtual Reality space comprising at least one virtual object being associated with a gesture for executing an action associated with said virtual object; determine that the virtual object is in a Line Of View; and providing a graphical marking of the virtual object; wherein the graphical marking includes an indication of the associated gesture.

Such a VR device is enabled to facilitate human perception by providing an indication of what gesture is associated with what icon so that commands can be given swiftly and accurately.

In one embodiment, the controller is further configured to provide a see-through view. The see-through view prompts and instructs the user to input a gesture and also provides (real time) feedback on the gesture being made.

In one embodiment, the VR device comprises a mobile communications terminal, such as a smartphone. In one embodiment, the VR device comprises an internet tablet or a (laptop) computer. In one embodiment, the VR device comprises a game console. In one embodiment, the VR device comprises a media device such as a television set or media system. In one embodiment the VR device comprises a pair of Augmented Reality or Virtual Reality glasses.

It is also an object of the teachings of this application to overcome the problems listed above by providing a method for use in a VR device comprising a display, said method comprising presenting a Virtual Reality space comprising at least one virtual object being associated with a gesture for executing an action associated with said virtual object; determining that the virtual object is in a Line Of View; and providing a graphical marking of the virtual object; wherein the graphical marking includes an indication of the associated gesture.

It is a further object of the teachings of this application to overcome the problems listed herein by providing a computer readable medium comprising instructions that when loaded into and executed by a controller, such as a processor, in a VR device cause the execution of a method according to herein.

The inventors of the present invention have realized, after inventive and insightful reasoning that by providing a graphical indication of an associated gesture as a marking of a selectable virtual object, possibly along with an animation (through a morphing) of the gesture and feedback of the gesture (through a see-trough view), a user's perception is facilitated greatly into being able to associate a virtual object, such as an icon, with a gesture, understanding how the gesture is to be made and receiving feedback of his gesture without risking to lose focus or confusing one icon with another as regards their associated gestures. The user is also not forced to look at different sections or portions of the display to perceive the same amount of information. Furthermore, no written text is required which reduces the need for optical or prescription glasses (which is sometimes a problem when wearing VR glasses).

Additionally, the concept taught herein saves display space.

Moreover, the concept taught herein reduces the power consumption and requirements of a VR device.

It should be explicitly noted that the simplicity and elegancy of the proposed solution is at the core of this invention and provides for a user interface that greatly facilitates human perception.

The concepts taught in this application are also applicable to augmented realities and mixed realities. For the purpose of this application Virtual Reality will thus be taken to also include augmented realities and mixed realities.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

An improved manner of selecting and activating an object will be disclosed below with reference to the accompanying figures. The example will be illustrated focusing on the handling of virtual objects in a Virtual Reality, but it should be clear that the processing is performed in part or fully in a VR device comprising a controller as disclosed herein with reference to FIGS. 9A, and 9B or caused to be performed by executing instructions stored on a computer-readable medium as disclosed with reference to FIG. 10.

Figure 1:
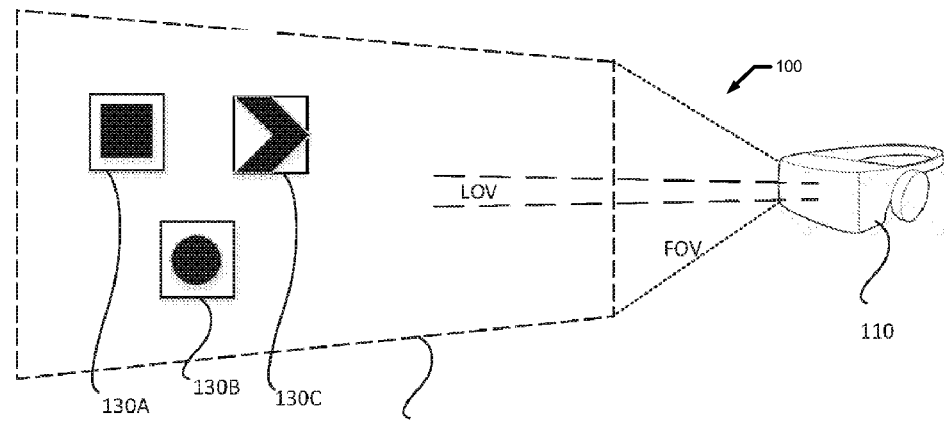
FIG. 1 shows an example embodiment of the operation of a VR device arranged to operate according to the teachings herein.

FIG. 1 show an example embodiment of the operation of a VR system 100 comprising a VR device 110 arranged to operate according to the teachings herein, wherein the VR device 110 is configured to present a virtual reality (VR). As stated above there will not be made any difference between a virtual reality, an augmented reality and a mixed reality for the context of this application and they will be referred to all as a virtual reality.

The virtual reality is presented as a VR space 120. The VR space 120 lacks physical dimension (other than as a display on the display device being used) and is therefore indicated with dashed lines. As would be appreciated and understood, the virtual reality in the display space is larger than as illustrated, actually it would be all encompassing, and the portion being presented is only the portion matching the user's current Field Of View (FOV).

The virtual reality comprises one or several virtual objects 130 and in the example of FIG. 1, three such virtual objects 130A-C are displayed, but it should be noted that any number of objects (including zero) may be displayed at any time. The objects 130 may be associated with a function. The function may be to open or activate a file for example, or it may be to execute a specific action. One example that will be used throughout this description is a virtual object representing an icon associated with a function of playing a media file. As a skilled person would appreciate, the number of possible combinations and variations of the actual objects and possible associated functions is too large to be adequately disclosed in a patent application and any such attempt would pose an undue burden on the Applicant.

The user is of course looking in a specific or general direction in the VR space and this direction will hereafter be referred to as the user's Line Of Sight or Line Of View (LOV). The Line Of View may be determined by tracking the user's eye movements or as being a general direction facing straight out into the VR space. The user can thus choose and select a graphical object 130 by looking at or close to it. In one embodiment the VR device is configured to only select and mark a virtual object being looked at. In such an embodiment, the Line Of View may be considered to have a narrow angle of 0.5, 1, 1.5, 2, 3, 4 or up to 5 degrees.

In one embodiment the VR device is configured to select and mark any virtual objects being in a vicinity or area that the user is looking at. In such an embodiment, the Line of View may be considered to have a narrow angle of 5, 10, 15, 20, 25 or up to 30 degrees.

The angle of the Line Of View may also be different in different dimensions to correspond to the dimensions of the display space 120. Alternatively or additionally, such an area may be confined in space to for example the middle 5%, 10%, 15% or 20% of the Field Of View. The area may be graphically marked to enable a user to direct it more easily, albeit at the price of the markings possibly cluttering the view. The VR device may be configured to only show the marking as a virtual object that is selectable is close to or within the area.

Figure 2:
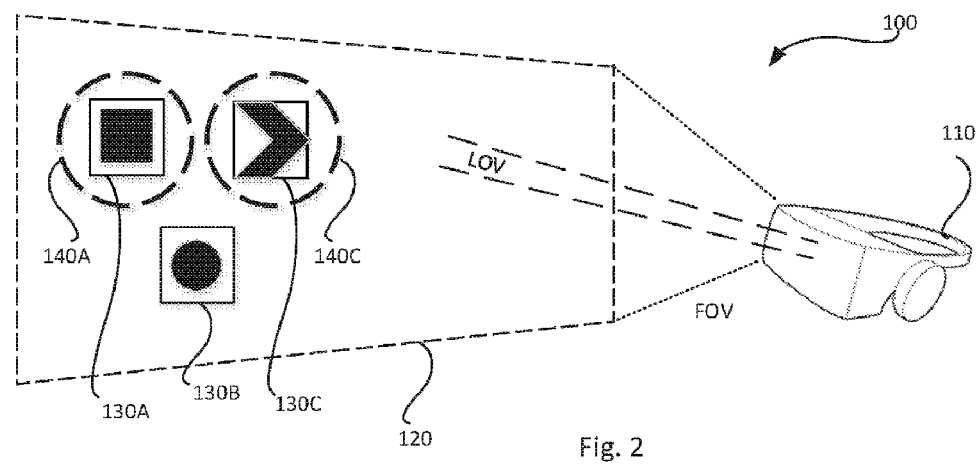
FIG. 2 shows an example embodiment of the operation of a VR device arranged to operate according to the teachings herein.

In the example of FIG. 2, the user has tilted his head, and consequently the VR device 110 and the Line Of View has shifted upwards and there are currently two virtual objects 130A and 130C being in the Line Of View of the user. The VR device is configured to mark or otherwise graphically highlight those virtual objects 130A and 130C as being selectable for further activation. In the example of FIG. 2, this is done by graphically changing (the edge of) the selectable virtual objects 130A, 130C, which is illustrated by the dashed circles.

The VR device 110 according to the teachings herein is also configured for gesture control, and more precisely to detect and track an object in front of a camera and to determine if the tracked object performs a specific gesture. Examples of such gestures are commonly known in gesture control systems and will not be explained in detailed herein.

However, it may be difficult for a user to remember all different gestures and since gestures need to be easily discernible, they might not be logically (as in having a clear logical link) linked to the associated function. Hence there is a problem that need to be solved by facilitating the human perception of a user in order to enable the user to perform the correct gesture for activating the wanted selected virtual object.

The inventor of the present invention has realized that, in order to facilitate the user's perception, the marking(s) of the virtual object(s) selectable for further activation may be morphed into the corresponding or associated gesture. The marking 140A, 140C, as illustrated in FIG. 3, will thus indicate the associated function and possibly, if the morphing is animated, also how to perform the gesture correctly.

Figure 3:
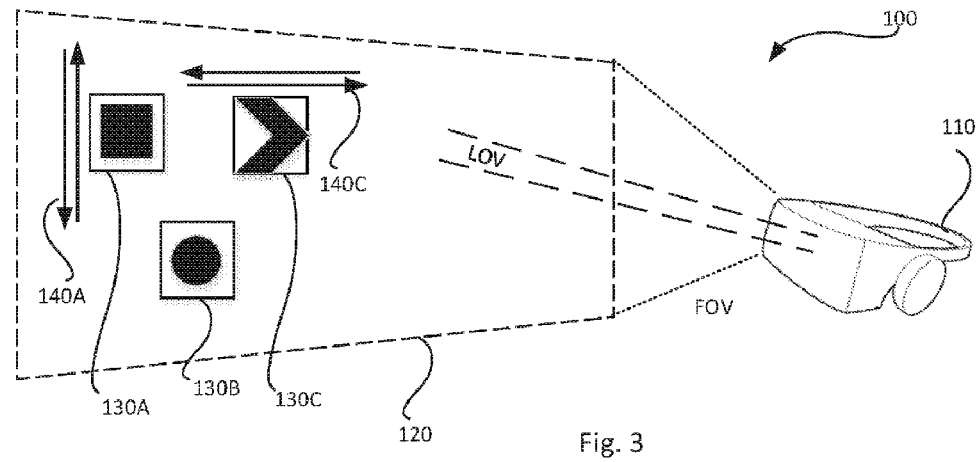
FIG. 3 shows an example embodiment of the operation of a VR device arranged to operate according to the teachings herein.

FIG. 3 shows an example of how the activation gestures of the virtual objects 130A, 130C selectable for further activation are shown graphically as the markings 140A, 140C of the virtual objects 130A, 130C.

The morphing is, in one embodiment, instantaneous whereby the graphical indication of the gesture is shown immediately.

The morphing is, in one embodiment, animated whereby the graphical indication of the gesture is shown as a morphing of the initial marking into the finished gesture. The exact manner of morphing a marking into a gesture depends on the marking and the gesture. However, as morphing is a common technique this will not be disclosed in detail and a skilled reader is directed to text books and other references for further details on such techniques.

Figure 4A:
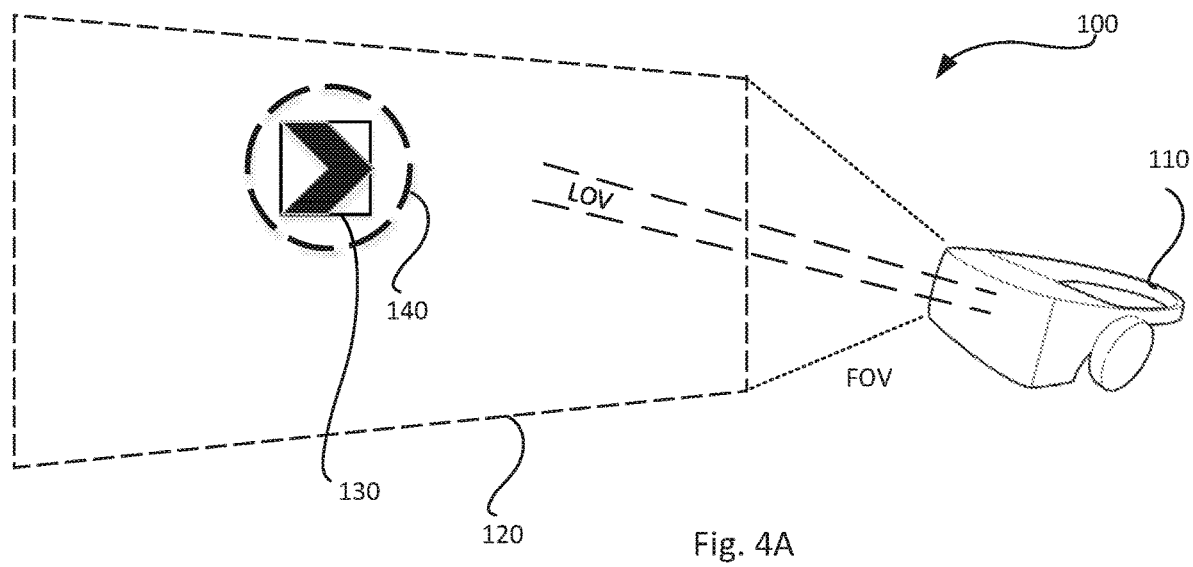
FIGS. 4A and 4B show an example embodiment of the operation of a VR device arranged to operate according to the teachings herein.
Figure 4B:
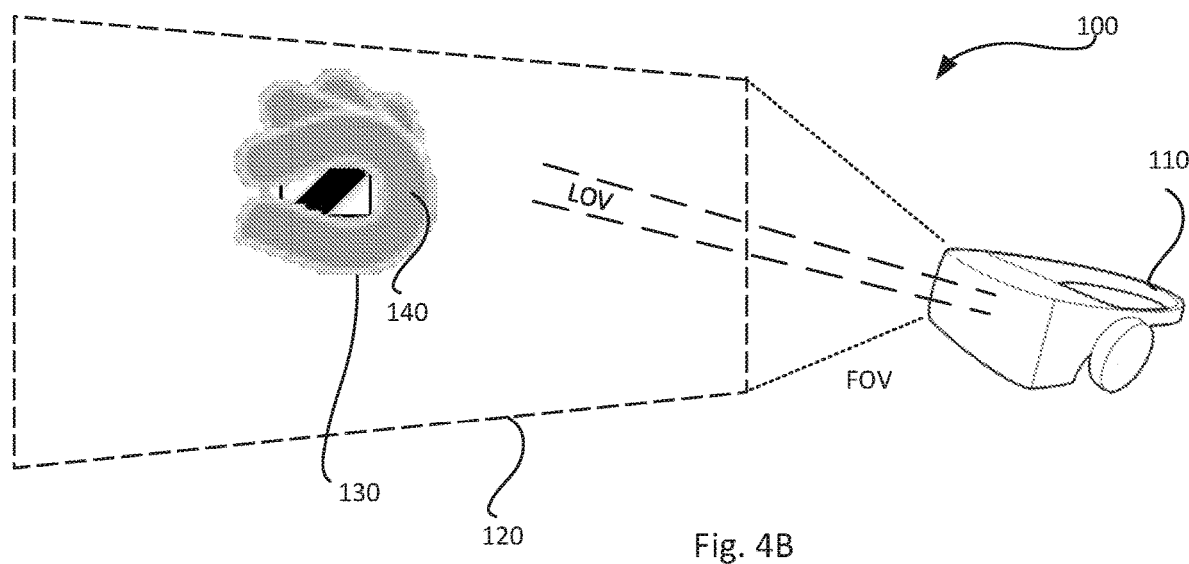

FIGS. 4A and 4B show an example of a morphing from a circular marking to a hand showing an "OK" sign as a virtual object 130 is marked for possible selection for further activation.

Returning to FIG. 3, a user's perception is thus facilitated regarding which virtual object(s) that may currently be selected for further activation and which is the associated gesture that needs to be performed, all while the user is simply looking in the general direction or at the virtual object(s). No other action is required at this stage by the user. The risk of the user changing focus while seeking to find further information is thus minimized. The user is also able to choose between more than one virtual object without further moving his head or other actions (apart from the actual selection gesture).

To further facilitate the user's perception both with regards to which action is to be taken and how this action is to be taken, the marking 140 of the virtual object(s) 130 that is(are) possible to select for further activation may be graphically shown to comprise a see-through field of view of the area behind the VR device 110. In one embodiment this see-through field of view may be the area immediately behind the virtual object (which will be in front of the user, or in the user's Line Of View). Or it may be an area surrounding a currently tracked object. In the latter example, the user does not need to move his hands in front of him to perform the gesture, something that may be highly appreciated in tight or crowded surroundings.

Figure 5A:
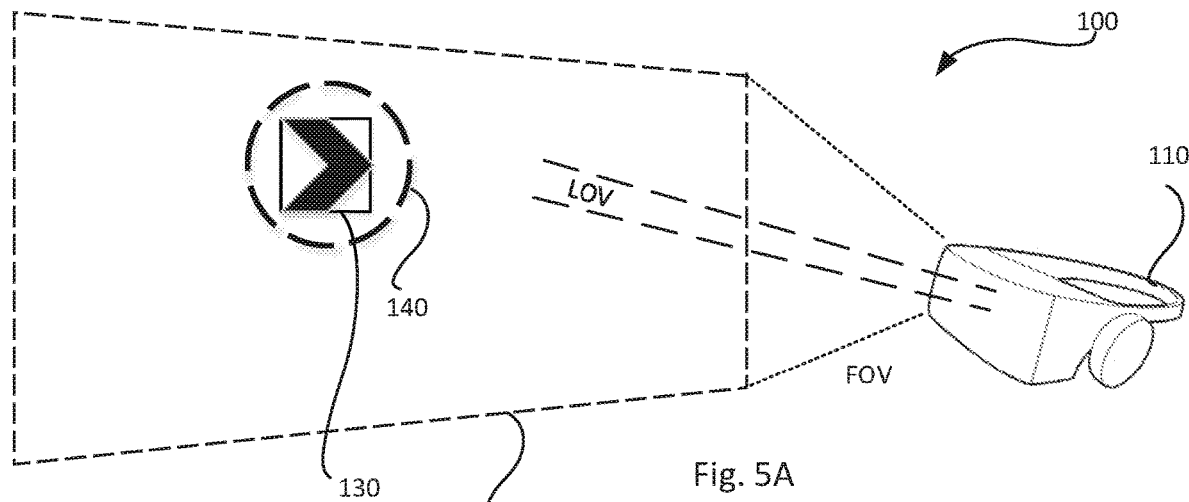
FIGS. 5A, 5B and 5C show an example embodiment of the operation of a VR device arranged to operate according to the teachings herein.
Figure 5B:
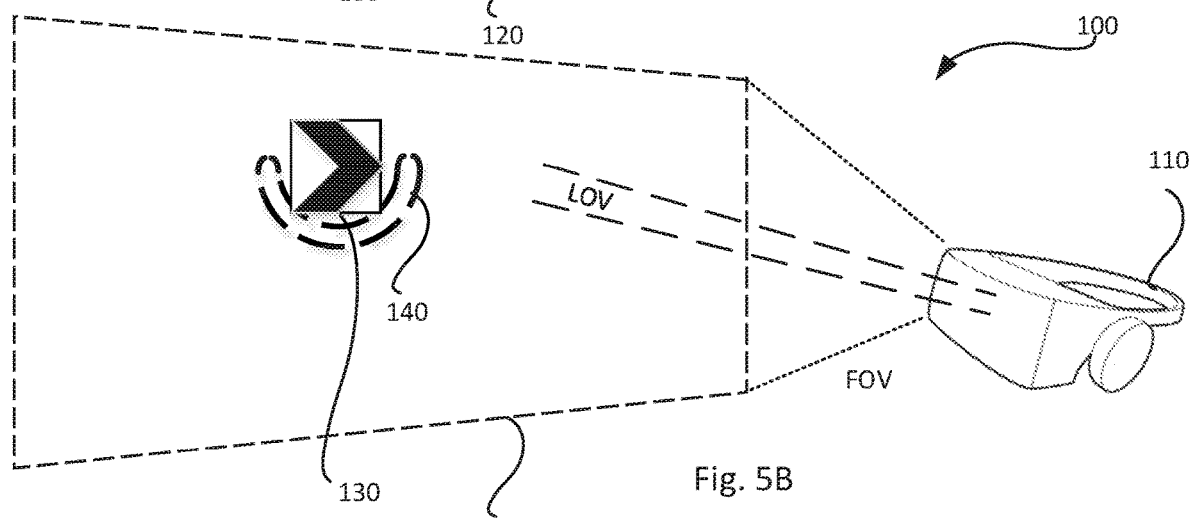
Figure 5C:
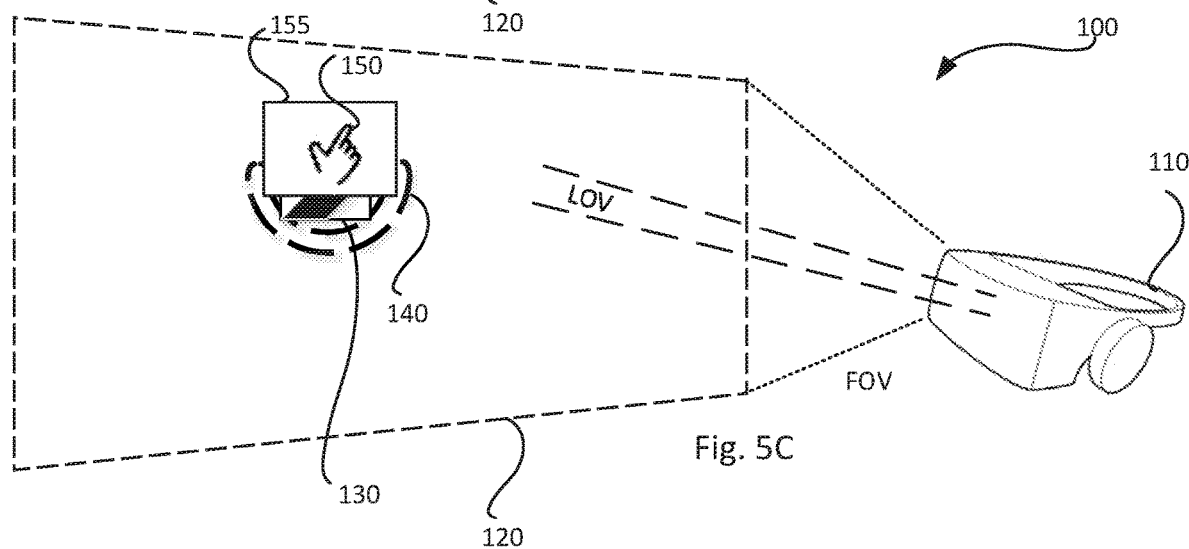

FIG. 5A shows an example of a virtual object 130 being marked (through marking 140) as selectable for further activation by the user directing his line of view towards the virtual object 130. FIG. 5B shows how the marking 140 is morphed into a gesture, here being indicated in a stylized manner as a U. FIG. 5C shows how the user's perception is further facilitated by also providing a see-through view 155 graphically connected or overlaying the marking, thus being part of the marking 140. The see-through view 155 shows the tracked object 155 performing the associated gesture. The user's perception has thus been facilitated in understanding which object to select and how, and also to perform the associated action and correct any inadequacies of the performed gesture in real-time (as the gesture is clearly visible) without making multiple movements or selections apart from gazing at or towards the virtual object and performing the gesture.

FIGS. 6A to 6D shows how a virtual object 130 is marked and how the marking 140 is morphed into an associated gesture. From this, a skilled person having read the contents of this application would realize how to implement the morphing of the markings.

Figures 6A, 6B, 6C, 6D, 6E:
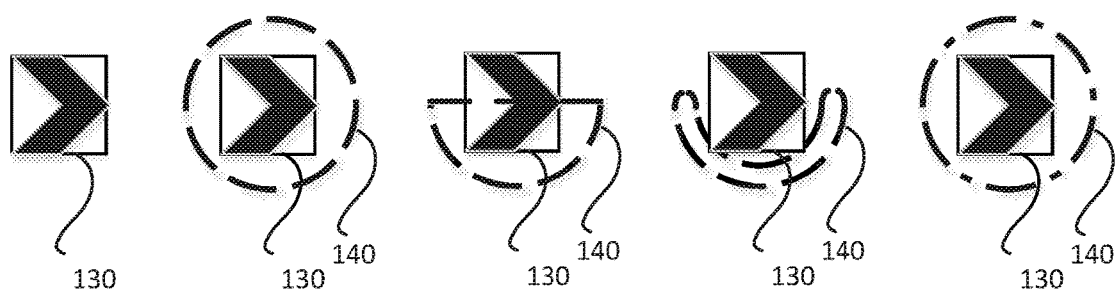
FIGS. 6A, 6B, 6C and 6D show an example embodiment of the morphology of a selected virtual object done by a VR device arranged to operate according to the teachings herein.
FIG. 6E shows an example embodiment of providing feedback of a successfully received gesture associated with a selected virtual object done by a VR device arranged to operate according to the teachings herein.

The VR device 110 may also be arranged to provide feedback that a gesture associated with a virtual object has been successfully received, that is identified and matched to a virtual object. Apart from actually executing the associated action, the VR device 110 may thus provide a graphic (and/or audible) feedback to the user, but changing the marking or adding to it. FIG. 6E shows an example of how the marking 140 is changed as a gesture has been identified. Some examples of how the feedback may be given are, changing the edge or border of a graphical representation (135) of the virtual object 130, changing the marking 140, adding a further marking (that may be seen as included in the marking 140, as marking 142 in FIG. 8), blinking, pulsating or otherwise highlighting the marking 140 or the graphical representation 135 to mention a few examples.

FIGS. 7A to 7E shows alternatives of how to present the marking 140 including the gesture indication and the see-through view of a virtual object 130.

Figures 7A, 7B, 7C, 7D, 7E:
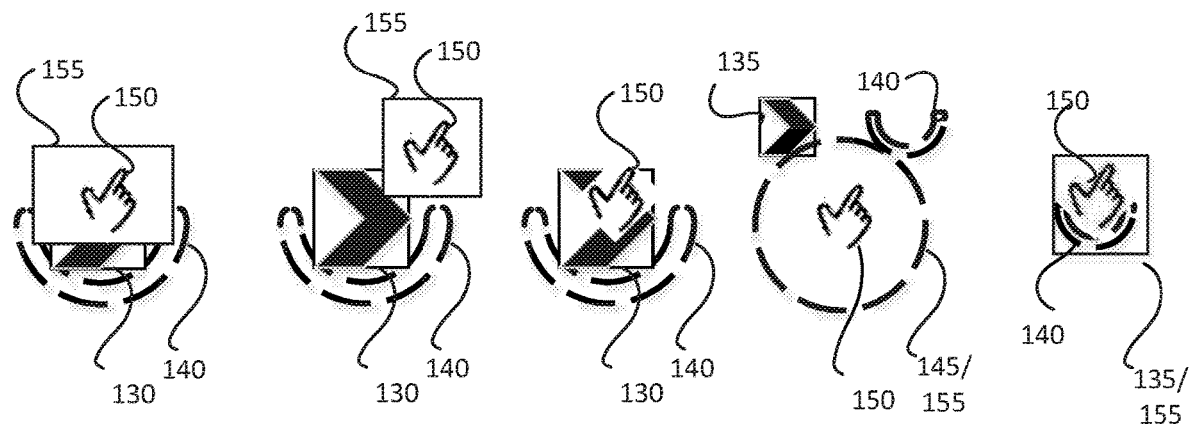
FIGS. 7A, 7B, 7C, 7D and 7E show example embodiments of the presentation of a selected virtual object done by a VR device arranged to operate according to the teachings herein.

In FIG. 7A the marking 140 is as in FIG. 6 and also includes a see-through view 155 showing a tracked object (as a hand) 150, where the see-through view is shown as partially or completely overlapping the virtual object. A partial overlapping enables a user to associate the gesture with the graphical representation of the virtual object. A complete overlap saves display space. A compromise between the two may be made by a system designer.

In FIG. 7B the see-through view 155 is displayed offset to a side or corner of the virtual object.

In FIG. 7C the see-through view 155 is displayed transparently over the virtual object 130. This enables for a higher degree of facilitating the human perception, but requires more computing power as it may be difficult to properly isolate the tracked object from the background in order to not clutter the display. Alternatively, the graphical presentation of the virtual object 130 may be transparently overlayed on the see-through view, proving a high degree of association while not requiring as much computing resources as isolating the tracked object.

In FIG. 7D both the graphical representation of the virtual object 135 and the indication of the associated gesture 140 are displayed offset to a side or corner of the virtual object. In this embodiment, and as is shown in FIG. 7D, the see through view 155 and the tracked object 150 may be displayed as a marked graphical representation of the virtual object 130 as part of a general marking 145/155. As can be seen in FIG. 7D, the graphical representation 135 and the indication of the gesture are shown in a smaller size. The size of the graphical markings, indications and see-through view may thus vary between embodiments.

In FIG. 7E both the see-through view 155 and the indication of the associated gesture 140 are displayed as being the graphical representation 135 of the virtual object.

Figure 8:
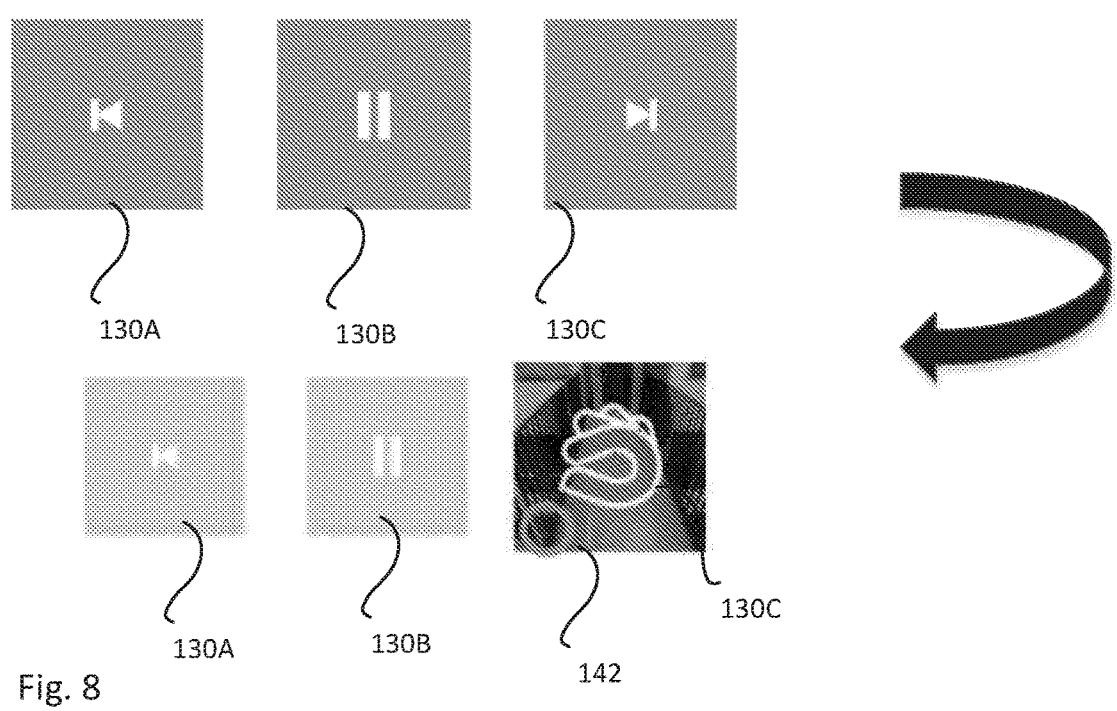
FIG. 8 shows an example embodiment of the operation of a VR device arranged to operate according to the teachings herein.

FIG. 8 shows a more detailed example of an embodiment as in FIG. 7E where three virtual objects 130A-C are displayed. As a user's gaze is directed towards or at a virtual object 130C, the object 130C is marked. In such an embodiment, the marking is provided by a see-through view being overlayed with a graphical representation of the associated gesture, the representation possibly being animated.

As is shown in FIG. 8, the remaining (visible) virtual objects 130A, 130B may be marked as not being selectable, by changing for example their colour, contrast, brightness and/or colour scheme (grey scale).

As mentioned in reference to FIG. 6E, a further graphical marking 142 may be provided indicating the progress/success of the user providing and the VR device 110 receiving the gesture. In this example, the further marking 142 is a circle that is empty when no gesture is received and full when a gesture has been correctly received.

Figure 9A:
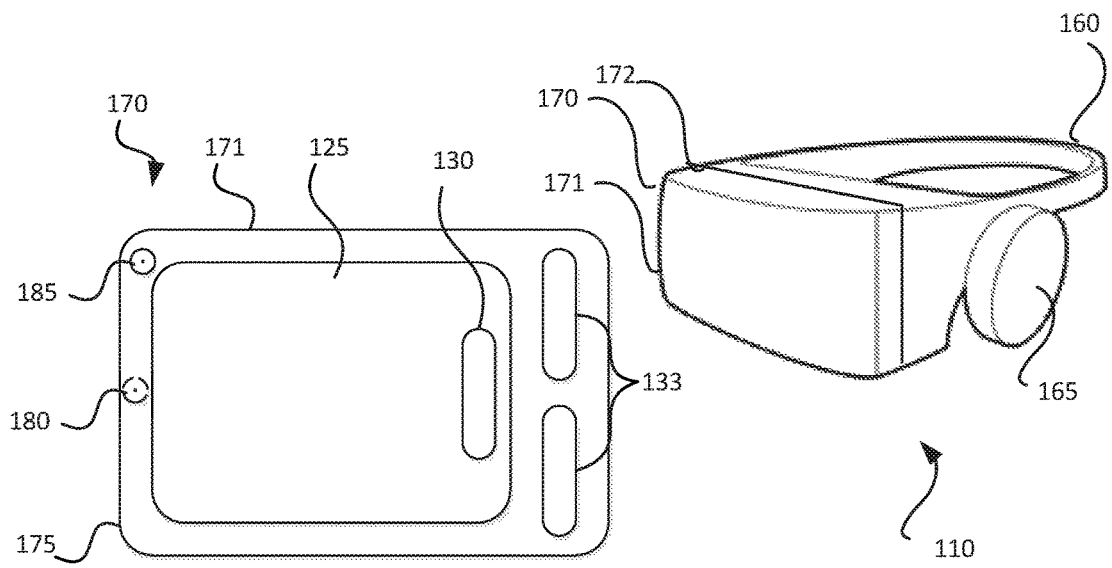
FIG. 9A is a schematic view of a VR device according to the teachings herein.

FIG. 9A generally shows a Virtual Reality (VR) device 110 according to an embodiment herein. In one embodiment the VR device 110 is configured for presenting a virtual reality to a user and allowing the user to operate or interact with the virtual reality. A VR device 110 typically comprises a main portion arranged to be carried on a user's head, often in the form of eye wear, popularly called VR glasses. The VR device 110 may thus comprise a strap 160 for holding the VR device 110 on a user's head. The VR device 110 may also comprise speakers 165 for providing audio as part of the VR experience. More prominently, the VR device 110 comprises a VR display 170. The VR display 170 may be a specific display integral to the VR device 110. In one embodiment, as in the example of FIG. 9A, the VR display 170 may comprise a holder 172 and an attachable VR display device 171. In such an embodiment, the VR display device 171 may be seen as being the virtual device 110, as it is in fact, this device that does most of the computing related to presenting the virtual reality.

I FIG. 9A an example of such a VR display device 171 is shown exemplified as a smartphone being one example of a mobile communications terminal. The description herein will be focused on the smartphone being the VR display 170 and no difference will be made between the VR display 170 and the VR display device 171. Other examples of VR display devices are a personal computers, desktop or laptop, an internet tablet, a personal digital assistant and a game console.

Referring to FIG. 9A the mobile communications terminal in the form of a smartphone 170 comprises a housing 175 in which a display 125 is arranged. In one embodiment the display 125 is a touch display. In other embodiments the display 125 is a non-touch display. Furthermore, the smartphone 170 comprises two (physical) keys 133. In this embodiment there are two keys 133, but any number of keys is possible and depends on the design of the smartphone 170. Examples of such (physical) keys are a mode key and an on/off key. In one embodiment the smartphone 170 is configured to display a virtual object 130 on the display 125. The virtual object 130 may be associated with a functionality and then constitutes an icon or a virtual key. It should be noted that the number of virtual objects, such as icons and virtual keys 130 are dependent on the design of the smartphone 170 and an application that is executed on the smartphone 170. The smartphone 170 is also equipped with a camera 180.

The camera 180 is a digital camera that is arranged to take video or still photographs by recording images on an electronic image sensor (not shown). In one embodiment the camera 180 is an external camera. In one embodiment the camera is alternatively replaced by a source providing an image stream. The camera 180 is, in this embodiment, arranged to face away from the display 125, possibly being arranged on the backside of the smartphone, as indicated by the dashed lines.

The VR device 110 also comprises a motion sensor 185 configured to detect motion and movement of the VR device and hence the user to enable the VR device to change what is being displayed accordingly. Such a motion sensor may be implemented through an accelerometer or a gyroscope.

In one embodiment the VR device may comprise a further camera or other means for tracking eye movements, where the VR device is configured to track the movement of the user's eyes and based on those eye movements determine which icon or area that the user is looking at. Such detection and tracking of eye movements can be used as an alternative to tracking the movements of a user's head. Such detection and tracking of eye movements can be used as a complement to support the tracking of the movements of a user's head. Such detection and tracking of eye movements can be used as in addition to tracking the movements of a user's head.

In an embodiment of the VR device of FIG. 9A where the display is a specific display and the VR device 110 does not comprise a smartphone 171 or other such device to be attached or connected, the VR device 110 also comprises a camera 180. In such an embodiment, the VR device 110 also comprise essential components such as the controller 910, the memory 940 and the motion sensor 185.

The VR device 110 may further comprise an interface for connecting with other devices. Such interfaces may be wired or wireless. Some examples of interfaces are USB (Universal Serial Bus) ports, Bluetooth™ ports, Ethernet ports or WiFi (according to IEEE standard 802.11) ports.

Figure 9B:
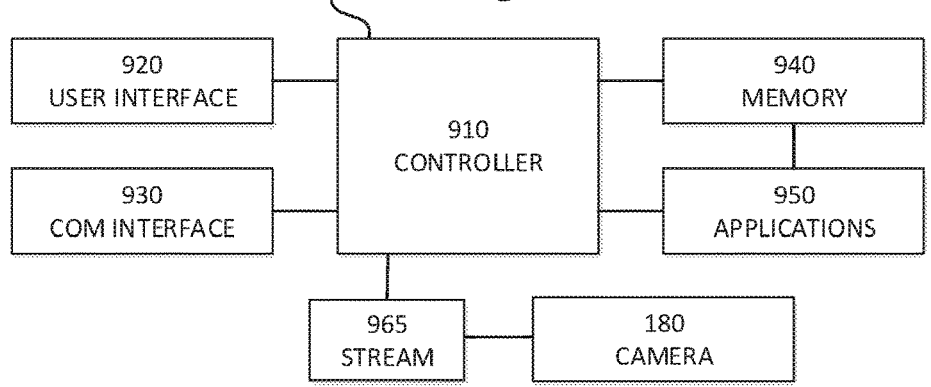
FIG. 9B is a schematic view of the components of a VR device according to the teachings herein.

FIG. 9B shows a schematic view of the general structure of a VR device according to FIG. 9A. The VR device 110 comprises a controller 910 which is responsible for the overall operation of the VR device 910 and is preferably implemented by any commercially available CPU ("Central Processing Unit"), DSP ("Digital Signal Processor") or any other electronic programmable logic device. The controller 910 is configured to read instructions from the memory 940 and execute these instructions to control the operation of the VR device 110. The memory 940 may be implemented using any commonly known technology for computer-readable memories such as ROM, RAM, SRAM, DRAM, CMOS, FLASH, DDR, SDRAM or some other memory technology. The memory 940 is used for various purposes by the controller 910, one of them being for storing application data and program instructions 950 for various software modules in the VR device 110. The software modules include a real-time operating system, drivers for a user interface 920, an application handler as well as various applications 950.

The VR device 110 comprises a user interface 920, which in the VR device of FIG. 9A is comprised of the display 125, the keys 130, 133 and the camera 180.

The VR device 110 may further comprise a communications (COM) interface 930, which is adapted to allow the VR device to communicate with other devices through a radio frequency band technology or a wired technology. Examples of such technologies are USB, Ethernet, IEEE 802.11, IEEE 802.15, ZigBee, WirelessHART, WIFI, Bluetooth®, W-CDMA/HSPA, GSM, UTRAN and LTE to name a few.

The VR device 110 is further equipped with or arranged to be connected to a camera 180. The camera 180 is a digital camera that is arranged to take video or still photographs by recording images on an electronic image sensor (not shown).

The camera 180 is operably connected to the controller 910 to provide the controller with a video stream 965, i.e. the series of images captured, for further processing possibly for use in and/or according to one or several of the applications 950.

In one embodiment the camera 180 is an external camera or source of an image stream. The camera may be two dimensional o three dimensional. The camera may be a stereo camera or a field of flight camera. As a skilled person would understand, there are many alternatives available for use as the camera.

Through the camera 180 (or rather the video stream) and the controller 910, the VR device 110 (possibly comprising a smartphone 170 as in FIGS. 9A and 9B), is configured to detect and track an object, such as a hand, via a video stream possibly provided by the camera 180. How such an object H is detected and tracked is disclosed in the Swedish patent application SE 1250910-5 and will not be discussed in further detail in the present application. For further details on this, please see the mentioned Swedish patent application. It should be noted, however, that the teachings of the present application may be implemented through the use of other tracking manners than disclosed in Swedish patent application SE 1250910-5.

Figure 10:
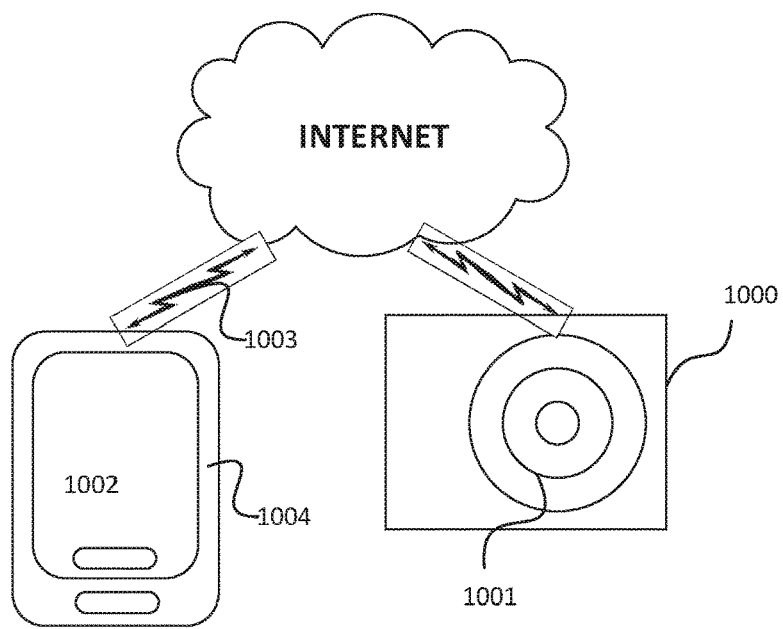
FIG. 10 is a schematic view of a computer-readable memory according to the teachings herein.

FIG. 10 shows a schematic view of a computer-readable medium as described in the above. The computer-readable medium 1000 is in this embodiment a data disc 1000. In one embodiment the data disc 1000 is a magnetic data storage disc. The data disc 1000 is configured to carry instructions 1001 that when loaded into a controller, such as a processor, executes a method or procedure according to the embodiments disclosed above. The data disc 1000 is arranged to be connected to or within and read by a reading device 1002, for loading the instructions into the controller. One such example of a reading device 1002 in combination with one (or several) data disc(s) 1000 is a hard drive. It should be noted that the computer-readable medium can also be other mediums such as compact discs, digital video discs, flash memories or other memory technologies commonly used.

The instructions 1001 may also be downloaded to a computer data reading device 1004, such as a smartphone or other device capable of reading computer coded data on a computer-readable medium, by comprising the instructions 1001 in a computer-readable signal 1003 which is transmitted via a wireless (or wired) interface (for example via the Internet) to the computer data reading device 1004 for loading the instructions 1001 into a controller. In such an embodiment the computer-readable signal 1003 is one type of a transient computer-readable medium 1000.

The instructions may be stored in a memory (not shown explicitly in FIG. 10, but referenced 940 in FIG. 9B) of the smartphone 1004. The smartphone of FIG. 10 possibly being a smartphone as in FIGS. 9A and 9B.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 11:
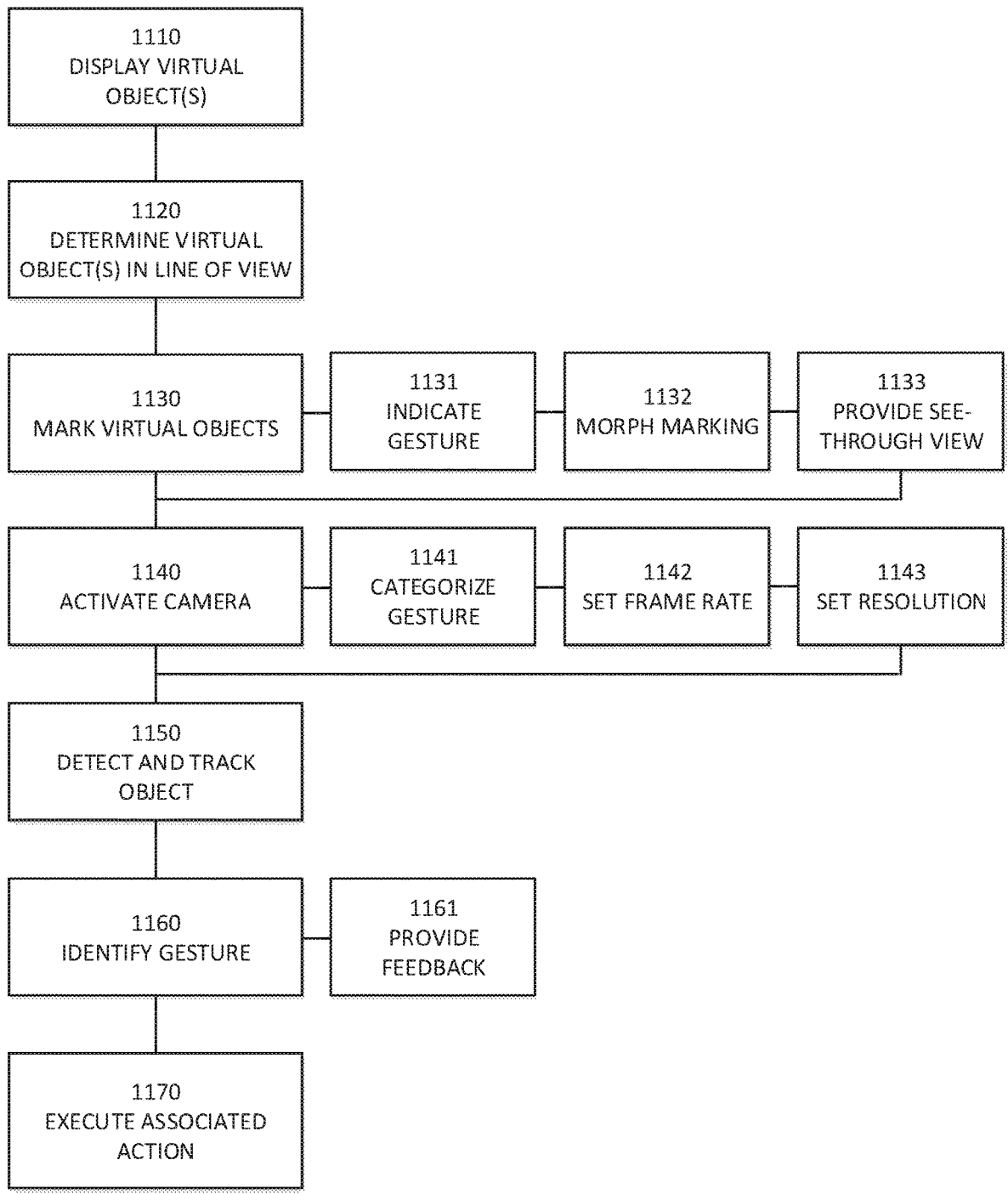
FIG. 11 shows a flowchart illustrating a general method according to an embodiment of the teachings herein.

FIG. 11 shows a flowchart of a general method according to the teachings herein. A VR device displays 1110 one or more virtual objects and determines 1120 which virtual object(s) is/are currently in a Line Of View and marks 1130 these virtual objects. If an object is associated with a gesture for activating the virtual object, i.e. for causing an action associated with the virtual object to be executed, the marking 1130 includes providing 1131 an indication of the gesture, where the indication of the gesture is graphically linked to the marking (as in being part of the marking). The VR device may be configured to morph 1132 the marking into the indication of the gesture. The VR device may also or alternatively be arranged to provide 1133 a see-through view as part of the marking. For further details on these markings, reference is made to FIGS. 1 to 8.

As a virtual object is determined to be selectable for activation, the VR device may be configured to activate 1140 the camera 180. By allowing the camera to be in a sleep or inactive mode when no object associated with a gesture is selectable (i.e. not looked or gazed at) saves power. To further save power (and also bandwidth and memory space), the VR device may be configured to determine 1141 a type of the associated gesture(s) and adapt the camera's setting based on the type of gesture. The gestures may be grouped into different types based on their dynamics and/or complexity. For example a moving gesture (swiping hand) requires more frames (a higher frame rate) than a static gesture ("OK" sign) (lower frame rate). A higher frame rate may be set as 10 fps (frames per second), 15 fps, 20 fps, 30 fps or higher. A lower frame rate may be set as 10 fps (frames per second), 7 fps, 5 fps or lower. A skilled reader would understand that the exact frame rate is not the issue but that the frame rate associated with a first type is gesture is different than the frame rate associated with a second type of gestures. The VR device 110 may thus adapt 1142 the camera's frame rate based on the gesture type. Similarly, the resolution used by the camera may also be set based on the type of gesture. A gesture being graphically clean or uncomplicated (swiping hand) does not require a high resolution to be recognized (assuming the hand is easily discernible from the background), whereas a gesture being graphically complicated (hand showing various numbers of fingers) may require a high resolution to be recognized, especially if the background is cluttered. As for the frame rate, the exact resolution used is not important for understanding the concept of this application, but that the resolution associated with a first type is gesture is different than the resolution associated with a second type of gestures. The exact resolutions used also depend on the camera used. Some example of high resolutions are 4K, Ultra HD, HD, 720 p and some examples of low resolutions are 720 p, 450 p, 330 p 250 p and 180 p. The VR device 110 may thus adapt 1144 the camera's resolution based on the gesture type.

As the camera is activated, the VR device identifies and tracks an object 1150, possibly by providing a see-through view of the tracked object. As the object is tracked, the VR device is configured to identify 1160 a gesture and to match this gesture to the associated marked virtual objects and in response thereto execute 1170 an action associated with the marked virtual object. Feedback regarding the success or progress of the received gesture may also be provided 1161.

Of course, the VR device may also be configured to identify a gesture as being associated with an object not being marked or to a different function or action, and in response thereto execute an associated action.

The teachings herein provide the benefit that a user's perception is facilitated in that the user is enabled to associate a virtual object with an associated gesture and how the gesture is to be performed and also with feedback on how the user is performing the gesture without having to make unnecessary movements (such as moving the user's head) thereby reducing the risk of losing focus of a virtual object, confusing one object with another regarding their functionality, and for associating the gesture with the virtual object for future reference. The user is also enabled to use the VR device, such as VR glasses, without glasses should the user wish so as no written information is needed to be read.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A VR device comprising a controller configured to:
presenting a Virtual Reality space, wherein said Virtual Reality space relates to augmented reality or mixed reality and comprises at least one virtual object being associated with a gesture for executing an action associated with said virtual object;
determine that the virtual object is in a Line Of View; and
providing a graphical marking of the virtual object, wherein the graphical marking includes an indication of the associated gesture;
wherein the graphical marking of the virtual object is provided as a morphing into the indication of the associated gesture, wherein the morphing is animated, whereby the indication of the associated gesture is shown as a morphing of the graphical marking into the indication of the associated gesture, thereby replacing the graphical marking with the indication of the associated gesture.

2. The VR device according to claim 1, wherein said controller is further configured to provide determine that a virtual object is in a Line Of View of the virtual object falls within an angle of the Line Of View.

3. The VR device according to claim 1, wherein said controller is further configured to provide a see-through view of a tracked object, said see-through view being included in the graphical marking of the virtual object.

4. The VR device according to claim 3, wherein said controller is further configured to overlay the indication of the gesture with the see-through view.

5. The VR device according to preceding claim 3, wherein said controller is further configured to provide said see-though view as a graphical representation of the virtual object in the Line Of View.

6. The VR device according to claim 1, wherein said controller is further configured to provide said indication of said gesture at a side of the marking.

7. The VR device according to claim 1, said VR device further comprising a camera, wherein said controller is further configured to activate the camera in response to determining that a virtual object is in the Line Of View.

8. The VR device according to claim 1, where the VR device further comprises a camera, wherein said controller is further configured to determine a type of the associated gesture and adapt a resolution of said camera based on the type of the associated gesture.

9. The VR device according to claim 1, where the VR device further comprises a camera, wherein said controller is further configured to determine a type of the associated gesture, wherein said controller is further configured to adapt a frame rate of said camera based on the type of the associated gesture.

10. The VR device according to claim 1, wherein said VR device is configured to be attached to a VR display device.

11. The VR device according to claim 10, wherein said VR display device is a smartphone.

12. The VR device according to claim 1, wherein said VR device is a smartphone.

13. The VR device according to claim 1, wherein said VR device comprises Virtual Reality glasses or Augmented Reality glasses.

14. A method for use in a VR device, said method comprising:

presenting a Virtual Reality space, wherein said Virtual Reality space relates to augmented reality or mixed reality and comprises at least one virtual object being associated with a gesture for executing an action associated with said virtual object;

determining that the virtual object is in a Line Of View; and providing a graphical marking of the virtual object, wherein the graphical marking includes an indication of the associated gesture;

wherein the graphical marking of the virtual object is provided as a morphing into the indication of the associated gesture, wherein the morphing is animated, whereby the indication of the associated gesture is shown as a morphing of the graphical marking into the indication of the associated gesture, thereby replacing the graphical marking with the indication of the associated gesture.

15. A non-transitory computer readable storage medium encoded with instructions that, when loaded and executed in a controller, causes the method according to claim 14 to be performed.

* * * * *